2,726,149
DEFOLIATION OF PLANTS

Loyd Q. Boyd, Highland, Ind., assignor to Standard Oil Company, Chicago, Ill., a corporation of Indiana No Drawing. Application November 29, 1954, Serial No. 471,893

7 Claims. (Cl. 71—2.2)

This invention relates to an improved method and means for defoliating plants, and it pertains more particularly to compositions and their method of application to growing plants to cause defoliation of the plant.

An object of this invention is to defoliate or hasten the defoliation of plants, especially those crop-bearing plants which defoliate naturally. Another object is to hasten the maturing of growing crop-bearing plants and thereby improve the grade and/or yield of the crop. A further object is to minimize damage to the corp from plant diseases, insects, or the like. An important object of this invention is to provide an efficient and economical method and means for defoliating growing crop-bearing plants without killing them whereby an improved grade and yield of the crop can be more economically harvested.

The defoliation of plants when they are nearing or at maturity has many advantages. Using cotton plants as an example, defoliation will expose the lower cotton bolls to sunlight for ripening purposes and thereby improve the quality and yield of the cotton crop. Other crop-bearing plants having luxuriant foliage which renders the fruit crop inaccessible to sunlight for ripening purposes are those such as soy beans, lima beans, tomatoes, fruit trees such as citrus fruit trees, apple trees, and the like. The harvesting of the crop is greatly facilated whether by hand picking or machine picking. Considerable time may be spent in hand picking cotton by looking for the open bolls which are hidden by the foliage. Defoliation renders the bolls readily discernible and facilitates rapid picking. In machine picking cotton, the open bolls are stripped from the plant and if there are dried leaves on the plant, the product is littered with what is commonly called "trash." Green leaves are crushed and cause staining of the cotton and thereby lowers its quality since the stain is exceedingly difficult if not impossible to remove. By removing the leaves the boll weevil, fall aphids, and leaf-worms are destroyed or deprived of their food supply and caused to starve or leave the area. This enables improved yields of cotton in subsequent plantings. Boll rot is reduced because the green cotton bolls are dried more rapidly. These and similar advantages accrue also when defoliating other plants in addition to those mentioned herein.

It has been discovered that water soluble inorganic iodide salts are highly effective for defoliating plants when applied to the plant leaves. Water soluble iodide salts such as ammonium iodide, alkali metal iodides, alkaline earth metal iodides, and the like may be applied as an aqueous solution to the plant leaves, and excellent defoliation of the plants may thus be obtained. This is particularly surprising because the other water soluble inorganic halide salts including fluorides, chlorides, and bromides have practically no defoliating effect.

The water soluble inorganic iodide salts which may be used are those such as ammonium iodide, alkali metal iodides such as lithium iodide, sodium iodide, potassium iodide, rubidium iodide and cesium iodide, the alkaline earth metal iodides such as magnesium iodide, calcium iodide, strontium iodide and barium iodide. The above listed iodides are soluble to the extent of at least about 40% by weight in water. However, iodides having a lesser solubility, e. g. 1% by weight in water, may be used. Sodium iodide and ammonium iodide are preferred. Wherever the terms iodide, halide, water soluble iodide or water soluble halide are used herein, it is to be understood to be the water soluble inorganic iodide or halide salt, respectively. The iodide is applied to the plants to be defoliated in an amount sufficient to cause the foliage to wither and drop from the plant. This amount is usually about 0.1 to 20, preferably 1 to 10, pounds of iodide per acre of plants. The amount used will vary depending upon the plant to be defoliated, the maturity of the plant, general atmospheric conditions, and other factors which affect resistivity to defoliation. The water soluble iodide is generally applied to the plant leaves when the plant is approximately at the state of maturity. If applied before the plant reaches maturity, a lesser degree of defoliation occurs. Certain plants are more resistant to defoliation, for example, cotton plants generally require about twice the amount of iodides than are necessary when defoliating soy beans or potatoes. Usually about 2 to 10 pounds of the iodide per acre of plants will be satisfactory when defoliating cotton.

The inorganic iodide salt is preferably employed in the form of an aqueous solution. The solution containing the water soluble iodide may be applied to the plants in the amount of 1 to 100 gallons, preferably 5 to 20 gallons, of solution per acre of plants. The amount of solution used is not of critical importance provided the proper amount of water soluble iodide is applied to the plant leaves. The effectiveness of the manner in which the solution is sprayed upon the plants generally determines the amount of solution used. When applied from the air, lesser amounts are usually employed since more effective contacting of the solution with the plant leaves is obtained. For example, about 2 to 10 gallons of solution per acre of plants would be used when applying from the air whereas about 20 gallons of solution would be a suitable amount when ground spraying rigs are used for spraying the solution. For economic reasons, it is preferred to employ the minimum amount of solution necessary to obtain good defoliation. The concentration of the water soluble iodide in aqueous solution will, of course, depend upon the amount of iodide to be applied per acre of plants and the amount of iodide solution to be applied per acre of plants. The concentration of the water soluble iodide in its aqueous solution may, therefore, vary within rather wide limits. When defoliating cotton, for example, a 1 to 10 weight percent solution of sodium iodide or other water soluble iodide may be applied to the cotton plants at the rate of about 20 gallons per acre of plants when using a ground spraying rig. The water soluble iodide may be applied to the plants by other methods. It can be applied in the form of powder extended with an inert if desired, and moistened thereafter by the atmosphere, rain, or artificial sprinkling. The water soluble iodide may be employed in the form of an emulsion of the iodide solution with oil. This may be a water-in-oil emulsion or oil-in-water emulsion containing from 0.01 to 100 parts of oil per part of water and an effective amount of an appropriate emulsifier. Emulsifiers such as petroleum mahogany sulfonates are suitable for producing an emulsion of oil in the aqueous solution of the water soluble iodide. Other suitable emulsifiers are alkyl aryl polyether alcohols (Triton X–100 and Triton X–45), polyoxyethylene sorbitol oleate and/or laurate, and the like.

A number of greenhouse experiments were performed which demonstrate the effectiveness of this invention. In these experiments a number of water soluble halides as well as a commercial defoliant were employed to determine their ability for killing the leaves of cotton plants and causing defoliation of the plants. In the experiments, variety Deltapine No. 15 cotton plants were grown in pots until mature. At this stage the plants were about 3 feet tall and the cotton bolls were about matured. The water soluble halides were applied to the cotton plants in the form of a solution in water. Commercial defoliant was applied in the manner and at the rate recommended by the manufacturer. Each treating agent was applied to 3 cotton plants to obtain replicate data. Each plant was treated individually in such a manner as to obtain uniform coverage of the plant. The aqueous solutions of the water soluble halides were applied with a hand sprayer equipped with a Peet-Grady nozzle. These halide solutions were applied at the rate of about 20 gallons of solution per acre of plants. The plants were inspected 10 days after the application of the treating material to determine the percentage of leaves which had been killed and the percentage of leaves which had dropped from the plant. These percentages were determined by a careful visual inspection. The results of the particular treatments, the amount of treating material, and the concentration at which it was applied are shown in the table which follows.

| Treating Agent | Amt. of Agent, lbs./acre of plants | Conc. of Agent, grams/100 cc. $H_2O$ | Percent Leaf Drop | Percent Leaf Kill |
| --- | --- | --- | --- | --- |
| Sodium Iodide | 1.67 | 1 | 44.6 | 65 |
| Do | 8.35 | 5 | 75.3 | 98 |
| Do | 16.7 | 10 | 87.8 | 100 |
| Do | 33.4 | 20 | 91.6 | 100 |
| Ammonium Iodide | 8.35 | 5 | 78.0 | 98 |
| Do | 16.7 | 10 | 83.0 | 100 |
| Sodium Fluoride | 8.35 | 5 | 0.0 | 5 |
| Do | 16.7 | 10 | 0.0 | 15 |
| Sodium Chloride | 8.35 | 5 | 6.8 | 10 |
| Do | 16.7 | 10 | 12.7 | 20 |
| Sodium Bromide | 8.35 | 5 | 9.8 | 15 |
| Do | 16.7 | 10 | 11.6 | 15 |
| Commercial Defoliant [1] | 30.0 | | 31.0 | 50 |

[1] Applied in powder form at rate recommended by manufacturer.

If the percentage leaf drop and the percentage leaf kill obtained with each treating agent is compared, it is obvious that the water soluble iodide is tremendously superior to any other treating agent. The application to 1.67 pounds of sodium iodide per acre of cotton plants results in a percentage leaf drop and percentage leaf kill which is far superior to that obtained with 10 to 18 times as much of any of the other treating agents. The water soluble halides other than iodides are almost ineffectual for causing leaf necrosis and defoliation of the cotton plant by comparison with the water soluble iodide. This astounding and unexpected effectiveness which is exhibited by the water soluble iodide alone of all the water soluble halides, enables an efficient and economical method of defoliating plants.

Other experiments relating to the use of water soluble iodides for defoliation were conducted. In one instance, sodium iodide in a concentration of 10% by weight in water was applied to mature soy bean plants in field testing at the rate of 20 gallons of iodide solution per acre of plants. Six days after the treatment the plants were checked visually to determine the percentage of leaves which had been killed, and after 10 days the plants were checked to determine the percentage of leaves which had dropped from the plants. The percentage leaf kill was 100% and the percentage leaf drop was 95%.

Thus having described the invention what is claimed is:

1. The method of defoliating crop bearing plants which comprises applying to the leaves of a plant having a crop at least nearing maturity, an amount of a water-soluble inorganic iodide salt effective to cause defoliation of said plant.

2. The method of claim 1 wherein said iodide salt is an alkali metal iodide.

3. The method of claim 1 wherein said iodide salt is ammonium iodide.

4. The method of claim 1 wherein said iodide salt is applied as an aqueous solution.

5. The method of defoliating crop-bearing plants which comprises applying an aqueous solution of water-soluble inorganic iodide salt to the leaves of a plant having a crop at least nearing maturity, said iodide salt being employed in the amount of 0.1 to 20 lbs./acre of plants.

6. The method of claim 5 wherein said iodide salt is sodium iodide.

7. The method of defoliating cotton plants having cotton bolls which are at least nearing maturity which comprises applying to the leaves of said plants an aqueous solution of sodium iodide, said iodide being employed in the amount of about 2 to 10 lbs./acre of plants and said aqueous solution being applied at the rate of about 5 to 20 gallons of solution per acre of plants.

References Cited in the file of this patent

Chemical Abstracts, vol. 45 (1951) col. 797[1].